Patented Dec. 17, 1946

2,412,815

UNITED STATES PATENT OFFICE 2,412,815

DICARBOCYANINE DYES

John David Kendall and Harry Derek Edwards, Ilford, England, assignors to Ilford Limited, Ilford, England, a British company No Drawing. Application December 17, 1943, Serial No. 514,667. In Great Britain January 1, 1943

4 Claims. (Cl. 260—240)

This invention relates to the production of dicarbocyanine dyes and particularly to the production of symmetrical dicarbocyanine dyes which are useful as optical sensitisers for silver halide photographic emulsions.

In co-pending application Serial No. 514,666 filed December 17, 1943, corresponding to British application No. 14/43, there is described the production of compounds of the general Formula I:

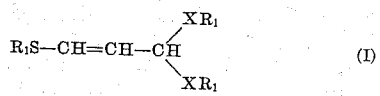

where the groups $R_1$ represent alkyl groups and preferably ethyl groups, and the groups X are both oxygen atoms or both sulphur atoms. Compounds of the general Formula I can be made, as described in the aforesaid application by treating with an alkyl mercaptan, in the presence of an acid condensing agent, a compound of one of the Formulae A, B, C, or D:

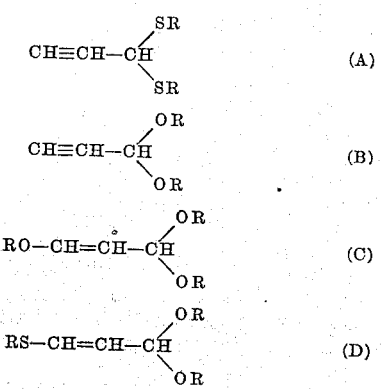

or by treating with an alkyl mercaptan in the presence of a basic condensing agent under pressure, a compound of Formula A.

Compounds of the general Formula A may be obtained by brominating acrolein and treating the product with an alkyl mercaptan followed by heating with an alkali to remove bromine. Compounds of general Formula B may be converted to compounds of general Formula D by treating them with a sodium alkyl mercaptide and an alkyl mercaptan under pressure.

Beta-alkyl-thio acrolein di-alkyl mercaptals can be made by treating a compound of Formula A in which the groups R are alkyl groups with alkyl mercaptan in the presence of a basic condensing agent under pressure.

According to the present invention, symmetrical carbocyanine dyestuffs are obtained by condensing a compound of general Formula I with an alkyl or aralkyl quaternary salt of a heterocyclic nitrogen compound containing a reactive methylene group (which term includes a methyl or mono-substituted methyl group) substituted in the α-position to the quaternary heterocyclic nitrogen atom.

The course of the reaction is believed to be as follows:

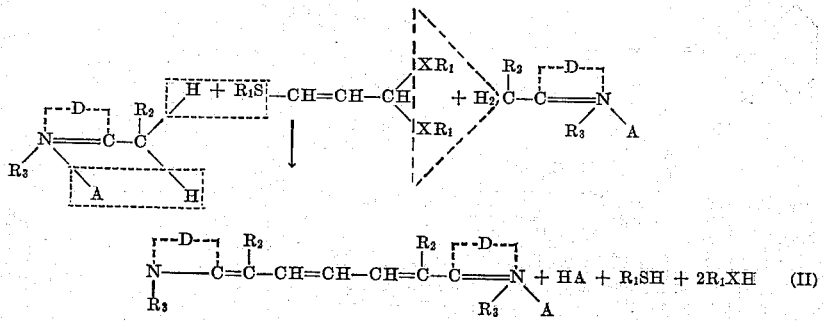

In the foregoing formulae $R_2$ and $R_3$ represent alkyl or aralkyl groups, $R_3$ may also be an unsaturated aliphatic group, e. g. allyl, or a substituted alkyl group, e. g. hydroxyalkyl, D represents the residue of a heterocyclic nitrogen nucleus and A represents an acid radicle.

Examples of heterocyclic nitrogen compounds which may be employed are quaternary salts containing the necessary reactive methylene (or methyl or mono-substituted methyl) group derived from the following heterocyclic nitrogen compounds: substituted and unsubstituted thiazoles, thiazolines, oxazoles, oxazolines, selenazoles, selenazolines, pyridine, quinoline, indolenine, diazines (e. g. pyrimidine and the diazines described in British patent specification No. 425,609), thiodiazoles and quinazoline and the corresponding substituted and unsubstituted polycyclic compounds such as the benzthiazoles, naphthathiazoles and anthrathiazoles and the corresponding polycyclic oxazoles and selenazoles. Such heterocyclic compounds may contain substituent groups in the benzene nuclei, e. g. alkyl, aryl, amino, hydroxy and alkoxy groups or halogen atoms.

The quaternary salts may be derived from various organic or inorganic acids, for example, they may be chlorides, bromides, iodides, alkyl sulphates, p-toluene sulphonates or perchlorates.

In carrying out the condensation using a compound of general Formula I where X is oxygen, it is generally convenient to heat the reagents together in the presence of a base and a solvent; pyridine is excellent in serving both purposes. When carrying out the condensation using a compound of general Formula I where X is sulphur, however, it is preferred to heat the reagents together in the presence of a solvent and a substance which will combine with alkyl mercaptan split off during the reaction (a suitable medium is acetic anhydride which serves both purposes) and to finish off the reaction by adding a base and heating for a further period.

The following examples illustrate the invention:

EXAMPLE I

*Preparation of 2:2'-diethyl thiadicarbocyanine iodide*

3.05 gms. of 1-methylbenzthiazole ethiodide, 1.11 gms. of β-ethyl-thio acrolein diethyl acetal and 15 ccs. of pyridine were mixed and boiled gently under reflux for 15 minutes. The reaction mixture was then poured into an aqueous solution of potassium iodide. The dye was precipitated and was filtered off, and washed with ethyl alcohol and ether. Recrystallisation from methyl alcohol solution yielded the dye as green needles. M. pt. 248° C. with decomposition. The dye had the structural formula:

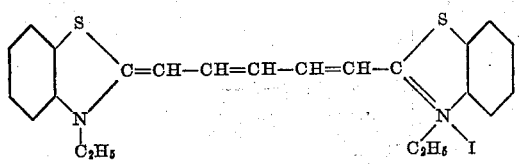

EXAMPLE II

*Preparation of 1:1'-diethyl 2:2'-quinodicarbocyanine iodide*

1.5 gms. of quinaldine ethiodide, 0.6 gm. of β-ethyl thio acrolein diethyl mercaptal and 10 ccs. of acetic anhydride were boiled gently under reflux until partly in solution. 0.7 cc. of triethylamine was then added and the heating continued for 10 minutes. The reaction mixture was cooled and the dye precipitated by dilution with ether. The liquors were decanted through a filter and the residue lixiviated with water. The dye was filtered off and washed well with ethyl alcohol and ether, being thus obtained as green crystals with a bronze reflex. M. pt. 245° C. (with decomposition), and giving a turquoise blue solution in alcohol. The dye had the structural formula:

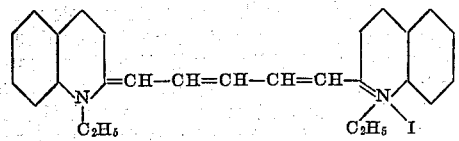

EXAMPLE III

*Preparation of 1:1'-dimethyl-indodicarbocyanine iodide*

1.5 gms. of 2:3:3 trimethyl indolenine methiodide, 0.6 gm. of β-ethyl-thio-acrolein-mercaptal and 10 ccs. of acetic anhydride were boiled gently under reflux until partly in solution. 0.7 cc. of triethylamine was then added, and the reaction mixture stirred. The boiling was continued for 5 minutes, and the reaction mixture was then allowed to cool. The dye was precipitated from solution by the addition of ether, and filtered off. Recrystallisation from methyl alcohol yielded the dye as blue crystals with a bronze reflex M. pt. 238° C. with decomposition. The dye had the structural formula:

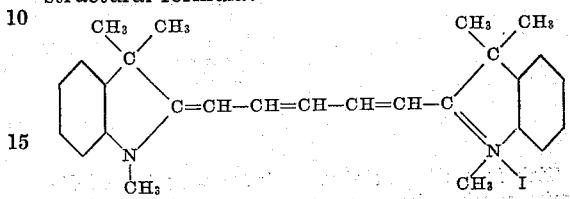

EXAMPLE IV

*Preparation of 3:3'-dimethyl-thiazolino dicarbocyanine iodide*

1.12 gms. of 2-methyl thiazoline methiodide, 1.0 gm. of β-ethyl-thio-acrolein-mercaptal, and 15 ccs. of acetic anhydride were boiled gently under reflux. To the solution was added 0.35 cc. of triethylamine and the heating continued for six minutes. The reaction mixture was allowed to cool, lixiviated with petroleum ether, the petroleum ether decanted off, and the residue diluted with ether. The precipitated dyestuff was filtered off and washed with ethyl alcohol, water, ethyl alcohol again and finally ether, and was obtained as silvery crystals. M. pt. 202° C. with decomposition. The dye had the structural formula:

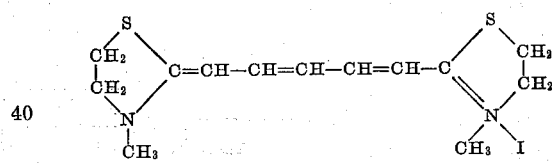

As already stated, the dyestuffs obtained by the process of this invention are valuable sensitisers for photographic silver halide emulsions. Thus, for example, the dyestuff of Example IV supra incorporated in a silver iodobromide emulsion, extends the sensitivity to about 6200 A. with a maximum sensitivity at about 5750 Å.

What we claim is:

1. Process for the production of dicarbocyanine dyes which comprises condensing a compound of the general formula:

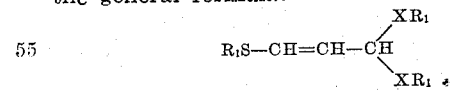

where the groups $R_1$ are alkyl groups and the groups X are the same and selected from the class consisting of oxygen and sulphur atoms, with a compound selected from the class consisting of alkyl and aralkyl quaternary salts of heterocyclic nitrogen compounds containing a reactive methylene group in α-position to the quaternary heterocyclic nitrogen atom of the type usual in the cyanine dye art.

2. Process for the production of dicarbocyanine dyes which comprises condensing a compound of the general formula:

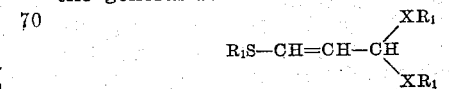

where the groups $R_1$ are lower alkyl groups and the groups X are the same and selected from the class consisting of oxygen and sulphur atoms, with a compound selected from the class consisting of alkyl and aralkyl quaternary salts of heterocyclic nitrogen compounds containing a reactive methylene group in α-position to the quaternary heterocyclic nitrogen atom of the type usual in the cyanine dye art.

3. Process for the production of dicarbocyanine dyes which comprises condensing β-ethyl-thio-acrolein dialkyl acetal, with a compound selected from the class consisting of alkyl and aralkyl quaternary salts of heterocyclic nitrogen compounds containing a reactive methylene group in α-position to the quaternary heterocyclic nitrogen atom of the type usual in the cyanine dye art, in the presence of a base and a solvent for the reactants.

4. Process for the production of dicarbocyanine dyes which comprises condensing β-ethyl-thio-acrolein dialkyl mercaptal with a compound selected from the class consisting of alkyl and aralkyl quarternary salts of heterocyclic nitrogen compounds containing a reactive methylene group in α-position to the quarternary heterocyclic nitrogen atom of the type usual in the cyanine dye art, by heating the reagents together in the presence of a solvent and a substance which will combine with the alkyl mercaptan split off during the reaction, and then adding a base and continuing to heat the reagents for a further period.

JOHN DAVID KENDALL.
HARRY DEREK EDWARDS.